United States Patent
Dixon

(10) Patent No.: US 8,949,958 B1
(45) Date of Patent: Feb. 3, 2015

(54) AUTHENTICATION USING MEDIA FINGERPRINTING

(75) Inventor: Scott Dixon, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 37 days.

(21) Appl. No.: 13/217,324

(22) Filed: Aug. 25, 2011

(51) Int. Cl.
- H04L 29/06 (2006.01)
- H04W 4/02 (2009.01)
- G06F 21/31 (2013.01)

(52) U.S. Cl.
CPC ............... *G06F 21/31* (2013.01); *H04L 63/083* (2013.01)
USPC ................................. 726/6; 726/2; 455/456.1

(58) Field of Classification Search
CPC .......... G06F 17/3074; G06F 17/30753; G06F 21/16; G06F 21/30; G06F 21/305; G06F 21/31; G06F 21/32; G06F 21/44; G08B 1/08; G08B 25/012; H04L 9/32; H04L 9/3231; H04L 63/08; H04L 63/083; H04L 63/107; H04L 63/0815; H04L 51/20; H04L 2025/03796; H04L 63/086; H04L 63/102; H04M 2201/40; H04M 2201/41; H04M 2203/6027; H04M 2242/30; H04N 21/4622; H04W 12/12; H04W 4/02
See application file for complete search history.

(56) References Cited

U.S. PATENT DOCUMENTS

| | | | | |
|---|---|---|---|---|
| 5,995,914 | A * | 11/1999 | Cabot | 702/109 |
| 6,285,772 | B1 * | 9/2001 | Tate et al. | 381/357 |
| 6,351,642 | B1 * | 2/2002 | Corbett et al. | 455/442 |
| 7,006,553 | B1 * | 2/2006 | McCorkle | 375/130 |
| 7,099,825 | B1 * | 8/2006 | Cook | 455/563 |
| 7,177,636 | B2 * | 2/2007 | Oda et al. | 455/426.1 |
| 7,242,964 | B1 * | 7/2007 | Aiken et al. | 455/561 |
| 7,403,773 | B2 * | 7/2008 | Kappes et al. | 455/432.1 |
| 7,634,400 | B2 * | 12/2009 | Averty et al. | 704/205 |
| 7,689,833 | B2 * | 3/2010 | Lange | 713/186 |
| 7,698,566 | B1 * | 4/2010 | Stone | 713/186 |
| 7,979,698 | B2 * | 7/2011 | Wong | 713/161 |
| 7,995,731 | B2 * | 8/2011 | Vernick | 379/202.01 |
| 8,279,052 | B2 * | 10/2012 | Heubel et al. | 340/407.2 |
| 2001/0041982 | A1 * | 11/2001 | Kawasaki et al. | 704/275 |
| 2002/0007238 | A1 * | 1/2002 | Moriguchi et al. | 701/36 |

(Continued)

OTHER PUBLICATIONS

Garcia-Romero, "Using quality measures for multilevel speaker recognition", Computer Speech and Language 20 (2006) 192-209, available online Sep. 23, 2005.*

(Continued)

*Primary Examiner* — Andrew Nalven
*Assistant Examiner* — Walter Malinowski
(74) *Attorney, Agent, or Firm* — Thomas | Horstemeyer, LLP

(57) ABSTRACT

Disclosed are various embodiments for determining if a requesting client is within a predetermined distance of a location of a trusted client. In one embodiment, a trusted signal having a plurality of trusted signal metrics may be established by the trusted client as being associated with a specified location. The trusted signal may then be rendered to the requesting client to be recorded as a contested signal. In one embodiment, an authentication service may then determine if the contested signal is of an adequate signal quality according a predetermined quality threshold. Assuming the contested signal is of an adequate quality, the authentication service then determines that the requesting client is within a common acoustic environment as the trusted client if the contested signal corresponds to the trusted signal by comparing a plurality of contested signal metrics with a plurality of trusted signal metrics.

24 Claims, 6 Drawing Sheets

(56) References Cited

U.S. PATENT DOCUMENTS

| | | | |
|---|---|---|---|
| 2002/0026635 A1* | 2/2002 | Wheeler et al. | 725/19 |
| 2002/0031240 A1* | 3/2002 | Levy et al. | 382/100 |
| 2004/0032853 A1* | 2/2004 | D'Amico et al. | 370/349 |
| 2005/0036589 A1* | 2/2005 | Bossemeyer | 379/88.01 |
| 2005/0185779 A1* | 8/2005 | Toms | 379/114.14 |
| 2006/0293839 A1* | 12/2006 | Stankiewicz et al. | 701/200 |
| 2007/0071206 A1* | 3/2007 | Gainsboro et al. | 379/168 |
| 2007/0129952 A1* | 6/2007 | Kenyon et al. | 704/500 |
| 2007/0172049 A1* | 7/2007 | Sumasu | 379/210.02 |
| 2007/0233483 A1* | 10/2007 | Kuppuswamy et al. | 704/247 |
| 2007/0282989 A1* | 12/2007 | Milstein et al. | 709/223 |
| 2008/0012701 A1* | 1/2008 | Kass et al. | 340/539.11 |
| 2008/0045161 A1* | 2/2008 | Lee et al. | 455/73 |
| 2008/0071535 A1* | 3/2008 | Yoshioka et al. | 704/246 |
| 2008/0176583 A1* | 7/2008 | Brachet et al. | 455/456.3 |
| 2008/0182534 A1* | 7/2008 | Bonesteel et al. | 455/161.3 |
| 2008/0214205 A1* | 9/2008 | Alles et al. | 455/456.1 |
| 2008/0233971 A1* | 9/2008 | Panabaker et al. | 455/456.1 |
| 2008/0291336 A1* | 11/2008 | Kim et al. | 348/729 |
| 2008/0311881 A1* | 12/2008 | Taaghol et al. | 455/404.2 |
| 2009/0027481 A1* | 1/2009 | Joung et al. | 348/14.02 |
| 2009/0047925 A1* | 2/2009 | Rahman | 455/404.2 |
| 2009/0052663 A1* | 2/2009 | Hammond et al. | 380/44 |
| 2009/0094029 A1* | 4/2009 | Koch et al. | 704/246 |
| 2009/0214004 A1* | 8/2009 | Caraballo et al. | 379/88.02 |
| 2010/0023328 A1* | 1/2010 | Griffin et al. | 704/231 |
| 2010/0124893 A1* | 5/2010 | Clevorn et al. | 455/226.3 |
| 2010/0273452 A1* | 10/2010 | Rajann et al. | 455/411 |
| 2011/0035420 A1* | 2/2011 | Alizadeh-Shabdiz et al. | 707/812 |
| 2011/0066025 A1* | 3/2011 | Bahn | 600/410 |
| 2011/0289098 A1* | 11/2011 | Oztaskent et al. | 709/203 |
| 2012/0086550 A1* | 4/2012 | LeBlanc et al. | 340/5.82 |
| 2012/0131657 A1* | 5/2012 | Sunstein et al. | 726/6 |
| 2012/0184372 A1* | 7/2012 | Laarakkers et al. | 455/41.2 |

OTHER PUBLICATIONS

Cano, "A Review of Audio Fingerprinting", Journal of VLSI Signal Processing, vol. 41, pp. 271-284, 2005.*

Faundez-Zanuy, "Speaker Verification Security Improvement by means of Speech Watermarking", Speech Communication, vol. 48, 2006, pp. 1608-1619.*

Welcome to Shazam, http://www.shazam.com, published Aug. 29, 2011 (accessed May 9, 2013).

* cited by examiner

AUTHENTICATION USING MEDIA FINGERPRINTING

BACKGROUND

Electronic applications and/or other protected content may require authorization before being accessible to a plurality of users. Users may request access to the electronic applications and/or protected content by a variety of ways. One or more services may then determine whether to grant the requests for access.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to authenticating a client device requesting access to one or more applications and/or protected content based on a location of the requesting client device in relation to a trusted client. In one embodiment, an authentication service is executed such that the trusted client may establish a trusted signal, such as, for instance, a portion of an audio file and/or a recorded passphrase. In one embodiment, when the requesting client requests access, the trusted signal is then rendered to the requesting client for recording which is then stored as a contested signal. The authentication service receives the contested signal from the requesting client and determines if the contested signal corresponds to the trusted signal. In one embodiment, the contested signal may correspond with the trusted signal if the contested signal was recorded within a common acoustic environment as the trusted client. For instance, the contested signal may share sufficient attributes and metrics with the trusted signal if the contested signal is recorded within a predetermined distance of the rendering source of the trusted signal. Thus, if the authentication service determines that a sufficient number of metrics between the contested signal and the trusted signal correspond to a predetermined degree of accuracy, the authentication service authenticates the requesting client device. In the following discussion, a general description of the system and its components is provided, followed by a discussion of the operation of the same.

Figure 1:
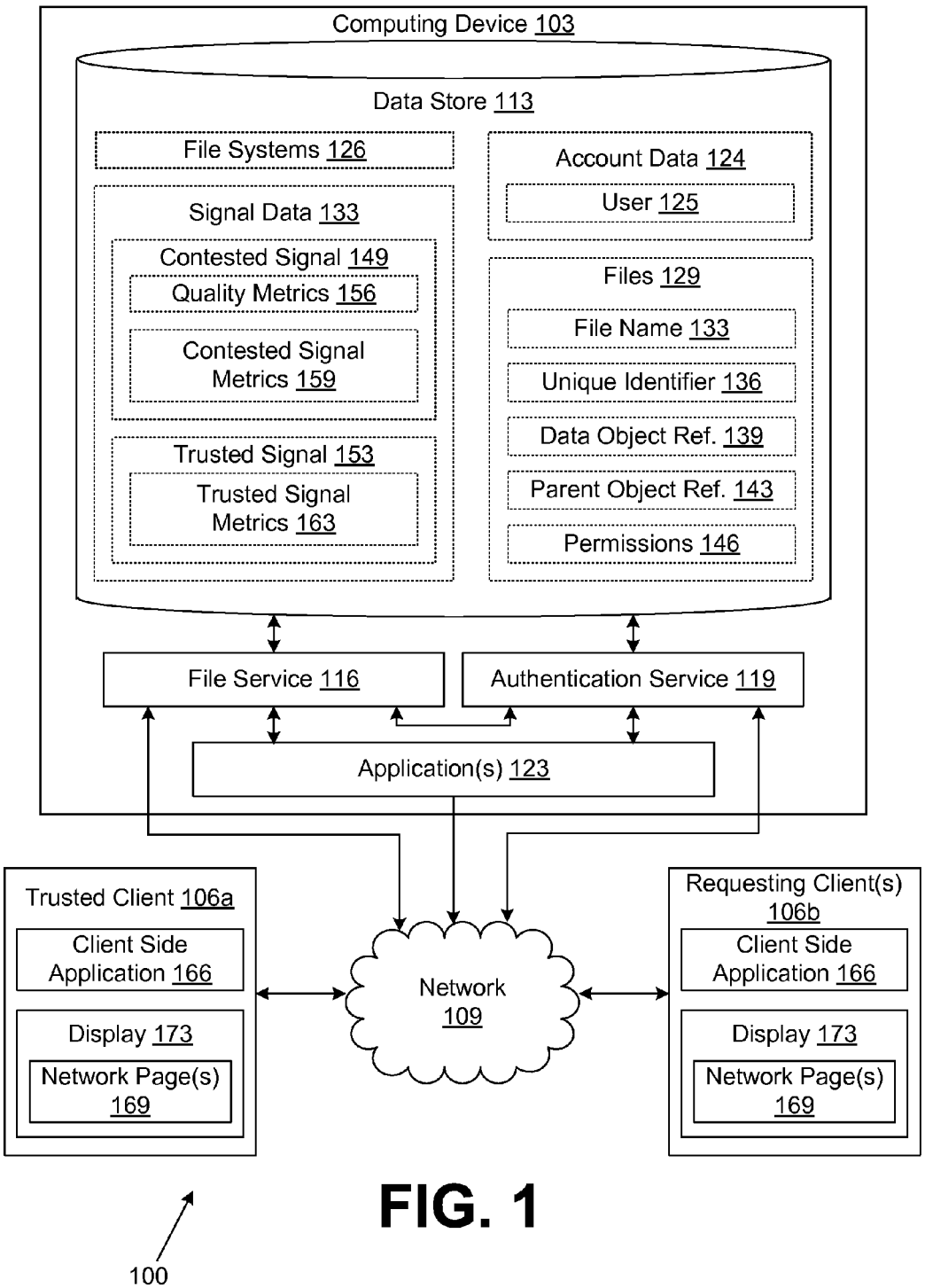
FIG. 1 is a drawing of a networked environment according to various embodiments of the present disclosure.

With reference to FIG. 1, shown is a networked environment 100 according to various embodiments. The networked environment 100 includes a computing device 103, a trusted client 106a, a requesting client 106b, and a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 113 that is accessible to the computing device 103. The data store 113 may be representative of a plurality of data stores as can be appreciated. The data stored in the data store 113, for example, is associated with the operation of the various applications and/or functional entities described below.

The components executed on the computing device 103, for example, include a file service 116, an authentication service 119, and other applications 123, services, processes, systems, engines, or functionality not discussed in detail herein. The file service 116 is executed to maintain an organization of files and folders in file systems associated with service accounts. To this end, the file service 116 may support various file-related operations such as, for example, creating files, deleting files, modifying files, setting permissions for files, downloading data files, and/or other operations. The authentication service 119 is executed to determine if a device requesting authentication is located within a predetermined distance of a trusted device in a known location. To this end, the authentication service 119 may support various media-related operations such as, for example, rendering, recording, comparing, and authenticating signals, where the signals may represent a portion of media content.

The applications 123 correspond to hosted applications that may access the data stored in the file system. Various applications 123 may, for example, have a web-based interface that may serve up network pages, such as web pages or other forms of network content, to facilitate user interaction. Other applications 123 may include internal applications that may not have a web-based interface. For example, the applications 123 may include media organizing tools, media consuming tools, word processors, email applications, and/or other applications 123.

The data stored in the data store 113 includes, for example, account data 124, file systems 126, files 129, signal data 133, and potentially other data. The account data 124 includes various data associated with file service accounts including data regarding authorized user(s) 125 of the computing device 103. In addition, account data 124 may also include usernames, passwords, security credentials, file management permissions, storage quotas and limitations, authorized applications, purchasing information, payment instrument information, billing information, and/or other data.

The file systems 126 correspond to logical file organizations that are maintained within the computing device 103 on behalf of one or more authorized users associated with a file service account. In various embodiments, the logical file organizations embodied in the file systems 126 are abstractions that do not directly correspond to any particular physical storage arrangements such as disk drives, portable storage media, etc. A file service account may be associated with one or more file systems 126. Each account-level user may have its own file system 126, or the file systems 126 may be shared by multiple account-level users.

Each file system 126 may include one or more files 129. A file 129 may include a file name 129, a unique identifier 136, a data object reference 139, a parent object reference 143, one or more permissions 146, a file creation date, a file modification date, and/or other data. The file name 133 may correspond to a human-readable character string that identifies the contents of the file 129. In one embodiment, the file name 133 may be limited in character length and may be limited in terms of allowed characters. In some cases, such limitations may be enforced for compatibility reasons. In addition, the file name 133 may be restricted to being unique to a folder and/or a file system 123 in various embodiments. In one embodiment, a file 129 may comprise a document and/or a media file, such as, for instance, an audio file, a video file, and/or any other type of media file.

The unique identifier 136 corresponds to a number, character string, or other identifier that uniquely identifies the file 129 across the file system 126 and/or all of the file systems 126. In one embodiment, the unique identifier 136 of a file 129 coupled with an identifier of a file system 126 may correspond to an identifier that is unique across all of the file systems 126. In another embodiment, the unique identifier 136 of a file 129 may itself be unique across all of the file systems 126.

The data object reference 139 corresponds to a reference that may identify a data object associated with the file 129 that is stored in a data store such as the data store 113. In one embodiment, the data object reference 139 may include a key value for obtaining the data object. The data stored from which to obtain the data object may be determined implicitly or explicitly, for example, from a definition in the data object reference 139. The parent object reference 143 corresponds to a reference that may identify a folder or file 129 that is considered to be the parent of the file 129. In this way, the folders are associated with files 129. In some situations, the parent object reference 143 may include a special identifier, such as, for example, NULL and/or 0, that identifies the root of the file system 126.

The permissions 146 may correspond to access permissions and security policies associated with the file 129. For example, a user may be designated as a file owner, and a group of users may be designated as a file group. In such an example, read or write access may be enabled or disabled as it applies to the user, the group of users, and/or all users. Similarly, access to a file 129 may be enabled or disabled as it applies to a file service account, a group of file service accounts, and/or all file service accounts. In another embodiment, each file 129 may also have an associated metadata that describes the content of the file 129. For example, the metadata may comprise text that includes keywords describing the content and/or type of file 129.

The signal data 133 corresponds to information that is associated with media available from a variety of sources. For example, the media may comprise audio data, video data, and/or any other type of media. In one embodiment, the media may originate from a variety of sources such as satellite receivers, televisions, and streaming media via the worldwide web. In another embodiment, the media may be an audio and/or a video recording by a user on a client 106. In yet another embodiment the signal data 133 may be at least a portion of a file 129 in the file system 126.

In addition, the signal data 133 includes a contested signal 149 and a trusted signal 153. In one embodiment, the contested signal 149 corresponds to a signal received from a user on a requesting client 106b seeking authentication. The contested signal 149 includes quality metrics 156 and contested signal metrics 159. In one embodiment, the quality metrics 156 correspond to measurements indicating a quality of the contested signal 149 and the contested signal metrics 159 correspond to measurements that uniquely describe the contested signal 149. For instance, assuming that the contested signal 149 is an audio file 129, the contested signal metrics 159 may include an amplitude, a phase, a frequency, a tone, and/or other identifying measurements of an audio file.

Additionally, the trusted signal 153 corresponds to a signal received from a user on a trusted client 106a seeking to authenticate a plurality of requesting clients 106b. Further, the trusted signal 153 includes a trusted signal metrics 163 describing the trusted signal 153. In one embodiment, the trusted signal 153 may be a file 129 from a user's file system 126 and the contested signal 149 may be a recording of the trusted signal 153, as will be described.

The trusted client 106a and requesting client 106b are representatives of a plurality of client devices that may be coupled to the network 109. The clients 106a/106b may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The clients 106a/106b may be configured to execute various applications such as a client side application 166 and/or other applications. The client side application 166 may be executed in clients 106a/106b, for example, to access and render network pages, such as web pages, or other network content served up by the computing device 103 and/or other servers. To this end, the client side application 166 may comprise, for example, a browser application or a similar application. When executed in the client 106a/106b, the client side application 166 renders network pages 169 on the display 173. Network pages 169 indicating content (e.g. files 129) of a file system 126 can include media. In one embodiment, the client side application 166 is integrated with an operating system of the client 106a/106b to provide access to the file system 126 similarly to a mounted file system of the client 106a/106b. The clients 106a/106b may be configured to execute applications beyond the client side application 166 such as, for example, email applications, instant message applications, and/or other applications.

Next, a general description of the operation of the various components of the networked environment 100 is provided. To begin, a user on a client 106 may wish to authenticate other users to use a variety of services based on a location of the other users. For instance, a location of a user may need to be authenticated to use services providing copyrighted content for consumption. As one example, a license to broadcast a copyrighted song may indicate that the song may only be broadcasted for consumption at a specified event, such as for example, a concert, a fundraiser, an organized party, and/or any other type of event. For instance, a music promoter may wish to make available for download a debut song by an aspiring artist to all participants and/or attendees of an organized event. To verify that any requests for download are originating from users attending the organized event, the music producer may authentic the devices of users to permit downloading based on the location of the device through the authentication service 119, as will be described.

As another example, a film studio may permit broadcasting of a film for consumption by a number of users located within a specified area. For example, the film studio may grant a license for one or more organizers of a film festival to stream a film to users on one or more client devices 106 that are located within a specified venue. The organizers of the film festival may wish to authenticate a location of the users requesting the streamed content through an authentication service 119, as will be described.

In one embodiment, the authentication service 119 authenticates a user based on a location by determining if a contested signal 149 received by a user requesting the authentication corresponds with a previously established trusted signal 153. For instance, the authentication service 119 determines if the contested signal 149 corresponds with the trusted signal 153 by comparing the contested signal metrics 159 with the trusted signal metrics 163, as will be described. If the authentication service 119 determines that the contested signal metrics 159 corresponds to the trusted signal metrics 163 to a predetermined degree of accuracy, the authentication service 119 may determine that the contested signal 149 corresponds with the trusted signal 153. The authentication service 119 may then transmit a notification back to the requesting service indicating a successful authentication.

On a first access, the authentication service 119 may request an indication as to whether the user is seeking to authenticate a plurality of other users based on a location, or seeking to request being authenticated. In one embodiment, the authentication service 119 may receive an indication that the user is seeking to authenticate a plurality of other users. In response, the authentication service 119 may then initialize the authentication system by requesting that the user establish the trusted signal 153 from the trusted client 106a. For instance, the trusted client 106a may be the device being used by the user to access the authentication service 119.

In one embodiment, the authentication service 119 may enable the user on the trusted client 106a to establish the trusted signal 153 by selecting a file 129 in the user's file system 126. In one embodiment, the user may select one or more files 129 and/or a portion of one or more files 129 to serve as the trusted signal 153 to use for authentication. For example, the file 129 from the file system 126 may be a unique media file 129 such as, for instance, a song, a recorded speech, another type of audio file 129, and/or any other type of media file 129. In another embodiment, the user may generate a trusted signal 153 by recording an audio file 129. For example, the user may record a passphrase, a song, ambient noise, and/or any other type of recording to serve as the trusted signal 153. The ambient noise may comprise noises occurring at the location of the trusted client 106a. For instance, if the trusted client 106a is located in a city park, the ambient noise may include birds, dogs, children, car horns, and/or any other type of noise commonly heard in a park. Additionally, the trusted signal 153 may be a combination of a file 129 from the file system 126 and a recording by the user. In one embodiment, the established trusted signal 153 is associated with the location of the trusted client 106a.

Having established a trusted signal 153, the authentication service 119 then determines the trusted signal metrics 163. In one embodiment, the trusted signal metrics 163 comprise measurements that uniquely describe the trusted signal 153. For instance, using the example of an audio file 129 from above, the trusted signal metrics 163 may comprise an amplitude, a frequency, a phase, a wavelength, and/or any other measurement to uniquely identify the audio file 129. The authentication service 119 may determine the trusted signal metrics 163 by executing one or more algorithms to analyze the trusted signal 153 as can be imagined. For instance, the authentication service 119 may conduct a Fourier analysis to describe the trusted signal 153 in a frequency domain and/or a time domain.

The user on the trusted client 106a may then render the trusted signal 153 to any users on requesting clients 106b requesting access to the protected content. In one embodiment, the user on the trusted client 106a may render the trusted signal 153 with a signal strength that corresponds with a desired range for the rendering. For example, if the user on the trusted client 106a desires that the range be limited to a predetermined distance from the location of the trusted client 106a, the signal strength for rendering the trusted signal 153 may correspond to the desired range. As such, only users on requesting clients 106b located within the predetermined distance of the location of the trusted client 106a will receive the rendered trusted signal 153. Any users on requesting clients 106b located outside of the predetermined distance of the location of the trusted client 106a may receive only a portion of the rendered trusted signal 153. In another embodiment, the trusted signal 153 established by the user on the trusted client 106a may be rendered by a source other than the trusted client 106a with the desired signal strength. In one embodiment, the trusted signal 153 may be rendered continuously over a period of time, at a periodic frequency, only when a request for a rendered trusted signal 153 is received, and/or any other frequency.

Next, the authentication service 119 may receive a request for accessing one or more applications 123 and/or the protected content by a user on one or more requesting clients 106b. In one embodiment, the authentication service 119 prompts the user on the requesting client 106b to provide a contested signal 149 in order to authenticate the requesting clients 106b. For instance, the authentication service 119 may provide for the user on the requesting client 106b to record a signal being rendered by the trusted client 106a. The user on the requesting client 106b may record the rendered signal and provide the recorded signal to the authentication service 119 to serve as the contested signal 149. The authentication service 119 may then use the contested signal 149 for authenticating the user on the requesting client 106b, as will be described.

Upon receiving the contested signal 149, the authentication service 119 may first determine whether the received contested signal 149 is of an adequate audio quality to perform the authentication analysis. For instance, the authentication service 119 may determine one or more quality metrics 156 for the contested signal 149. As discussed above, the quality metrics 156 may comprise one or more measurements describing the quality of the contested signal 149, such as, for instance an amplitude, an amount of power, an intensity, a dynamic range, a signal-to-noise ratio, a total energy and/or any other measurement indicating an amount of quality of the contested signal 149. In one embodiment, the authentication service 119 may execute one or more algorithms to determine the quality metrics 156 as can be imagined.

Next, the authentication service 119 may determine whether the quality metrics 156 of the contested signal 149 exceed a predetermined threshold for the authentication service 119 to execute the authentication procedure. In one embodiment, the predetermined threshold may be the minimum amount of quality needed to compare the contested signal 149 with the trusted signal 153, as will be described. For instance, the authentication service 119 may determine whether the quality metrics 156 exceed a predetermined amplitude, power, intensity, total energy and/or any other measurement indicating an amount of quality. If the quality metrics 156 satisfy the predetermined threshold, the authentication service 119 may determine that the quality of the contested signal 149 is adequate for the authentication analysis. In addition, the authentication service 119 may also determine the contested signal metrics 159 using a similar approach to determining the trusted signal metrics 163, as described above.

In one embodiment, the authentication service 119 authenticates the requesting client 106b if the contested signal 149 received from the requesting client 106b corresponds to the trusted signal 153 established by the trusted client 106a. For instance, the authentication service 119 determines if the contested signal metrics 159 associated with the contested signal 149 correspond to the trusted signal metrics 163 associated with the trusted signal 153.

In one embodiment, to assist with the determination of whether there is a correspondence, the authentication service 119 may first normalize the contested signal 149 according to the trusted signal 153. As an example, the authentication service 119 may normalize the contested signal 149 with the trusted signal 153 using peak normalization where each of the levels in the contested signal 149 are uniformly changed to reach a specified level to correspond with the trusted signal 153. As another example, the authentication service 119 may normalize the contested signal 149 with the trusted signal 153 using root mean square (RMS) normalization where the contested signal 149 is adjusted based on its average level. In one embodiment, the measured contested signal metrics 159 may change according to the normalization to more accurately describe the normalized contested signal 149. For instance, an amplitude described by the contested signal metrics 159 may change according to the normalized contested signal 149.

In another embodiment, the authentication service 119 may normalize the contested signal 149 according to the device characteristics of the requesting client 106b. For instance, a microphone associated with the requesting client 106b used to record the rendered trusted signal 153 may interfere with the contested signal 149 such as, for instance, impedance of the microphone, radio-frequency interference, and/or any other type of microphone interference. As such, in normalizing the contested signal 149, the authentication service 119 may account for any interference introduced by the device characteristics of the requesting client 106b.

Having normalized the contested signal 149, the authentication service 119 may then determine if the normalized contested signal 149 corresponds to the trusted signal 153 by comparing the contested signal metrics 159 of the normalized contested signal 149 with the trusted signal metrics 163. As described above, the contested signal metrics 159 and the trusted signal metrics 163 are a plurality of measurements that uniquely describe the contested signal 149 and trusted signal 153, respectively. In one embodiment, the authentication service 119 may determine that the contested signal 149 corresponds to the trusted signal 153 if a predetermined number of contested signal metrics 159 metrics correspond to respective ones of the trusted signal metrics 163 to a predetermined degree of accuracy. For example, the authentication service 119 may determine that a Fourier transform function of the normalized contested signal 149 may correspond to the Fourier transform function of the trusted signal 153 to a predetermined accuracy. Accordingly, the authentication service 119 may then determine that the contested signal 149 corresponds to the trusted signal 153.

In one embodiment, the authentication service 119 may determine if there is a correspondence between the contested signal 149 and the trusted signal 153 when the two signals are of varying lengths. For instance, the trusted signal 153 may be a continuous signal over a period of time and the contested signal 149 may be a segment of the continuous signal over only a portion of the period of time. In this example, the authentication service 119 may first identify a location within the trusted signal 153 where the contested signal 149 may be found by aligning the clocks of each of the signals, by identifying similarity between the respective signals, or by using other approaches.

In another embodiment, the authentication service 119 may determine if there is a correspondence between the contested signal 149 and the trusted signal 153 when the two signals are related to different clocks. For instance, the trusted signal 153 and the contested signal 149 may include water markers, tags, bookmarks, references and/or any other indicator for marking various locations within the signal with respect to a clock. In this instance, the authentication service 119 may align the trusted signal 153 and the contested signal 149 by matching the indicators of the two signals. Once the authentication service 119 aligns the trusted signal 153 and the contested signal 149, the authentication service 119 may then determine if there is a correspondence between the signals 153/149, as described above.

Upon finding that the contested signal 149 corresponds to the trusted signal 153, the authentication service 119 authenticates the requesting client 106b thereby granting access to applications 123 and/or other protected content. In one embodiment, a determination that the contested signal 149 corresponds to the trusted signal 153 may indicate that the requesting client 106b is located within a predetermined distance of the trusted client 106a. For instance, a finding that the contested signal 149 and the trusted signal 153 correspond may indicate that the contested signal 149 is of an adequate quality and shares a predetermined number of contested signal metrics 159 to a predetermined accuracy with the trusted signal 153. In one embodiment, the quality of the contested signal 149 and the similarity between the contested signal 149 and the trusted signal 153 may indicate that the contested signal 149 was recorded on a requesting client 106b within a predetermined distance of the location of the trusted client 106a. Therefore, the authentication service 119 may authenticate the requesting client 106b and grant access to one or more of the applications 123 and/or any protected content.

Figure 2:
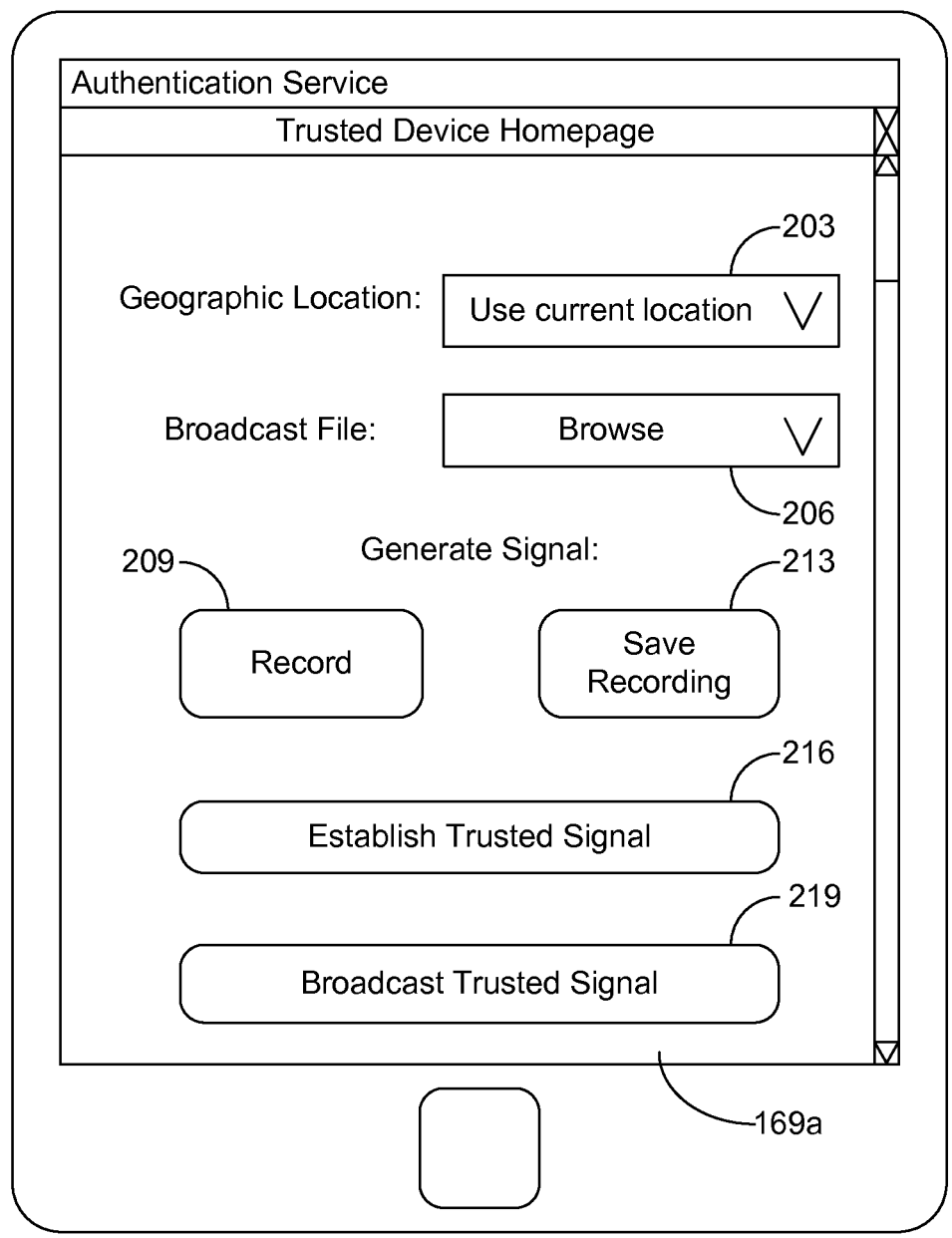
FIGS. 2-4 are drawings of an example of a user interface rendered by a client in the networked environment of FIG. 1 according to various embodiments of the present disclosure.

Referring next to FIG. 2, shown is one example of a network page 169, denoted herein as network page 169a, according to various embodiments of the present disclosure. The various graphical components such as blocks comprising information shown in FIG. 2 are merely examples of the various types of features that may be used to accomplish the specific function noted. The network page 169a is rendered on a display 173 (FIG. 1) associated with the client 106 (FIG. 1) according to various embodiments. In another embodiment, FIG. 2 may be viewed as depicting the display output of the client side application 166 (FIG. 1), according to various embodiments of the present disclosure.

In one embodiment, the authentication service 119 (FIG. 1) generates the network page 169a to display a homepage for a user on a trusted client 106a. As shown, the network page 169a depicts a geographic location field 203, a render file field 206, a record button 209, a save recording button 213, an establish button 216, and a render button 219. The geographic location field 203 may permit a user to indicate a geographic location to establish as the trusted location. In one embodiment, the user may indicate that the location of the trusted client 106a serve as the trusted location. In another embodiment, the user may indicate another geographic location to serve as the trusted location by providing an address, and/or a pair of geographic coordinates.

Next, the user on the trusted client 106a may establish the trusted signal 153 (FIG. 1). In one embodiment, the user may select a file 129 (FIG. 1) from a user's file system 126 (FIG. 1) to serve as the trusted signal 153, as described above. In another embodiment, the user may record speech and/or ambient noise to serve as the trusted signal, such as, for example, a passphrase. As such, toggling the record button 209 may allow the user to record via a microphone associated with the trusted client 106a and toggling the save recording button 213 may save the recording as an audio file 129. Having selected a file 129 and/or made a recording, the user may establish the audio file 129 and/or recording as the trusted signal 153 by toggling the establish button 216. The authentication service 119 may then determine the trusted signal metrics 163 for the trusted signal 153, as described above.

In addition, the user may render the trusted signal 153 over the air to any requesting clients 106b via the render button 219. In one embodiment, the trusted signal 153 may be continuously rendered, rendered at a predefined frequency, and/or rendered only upon a request for access received by a requesting client 106b, as described above. In another embodiment, the network page 169a may include a field for providing a signal strength and/or a desired range for rendering the trusted signal 153.

Figure 3:
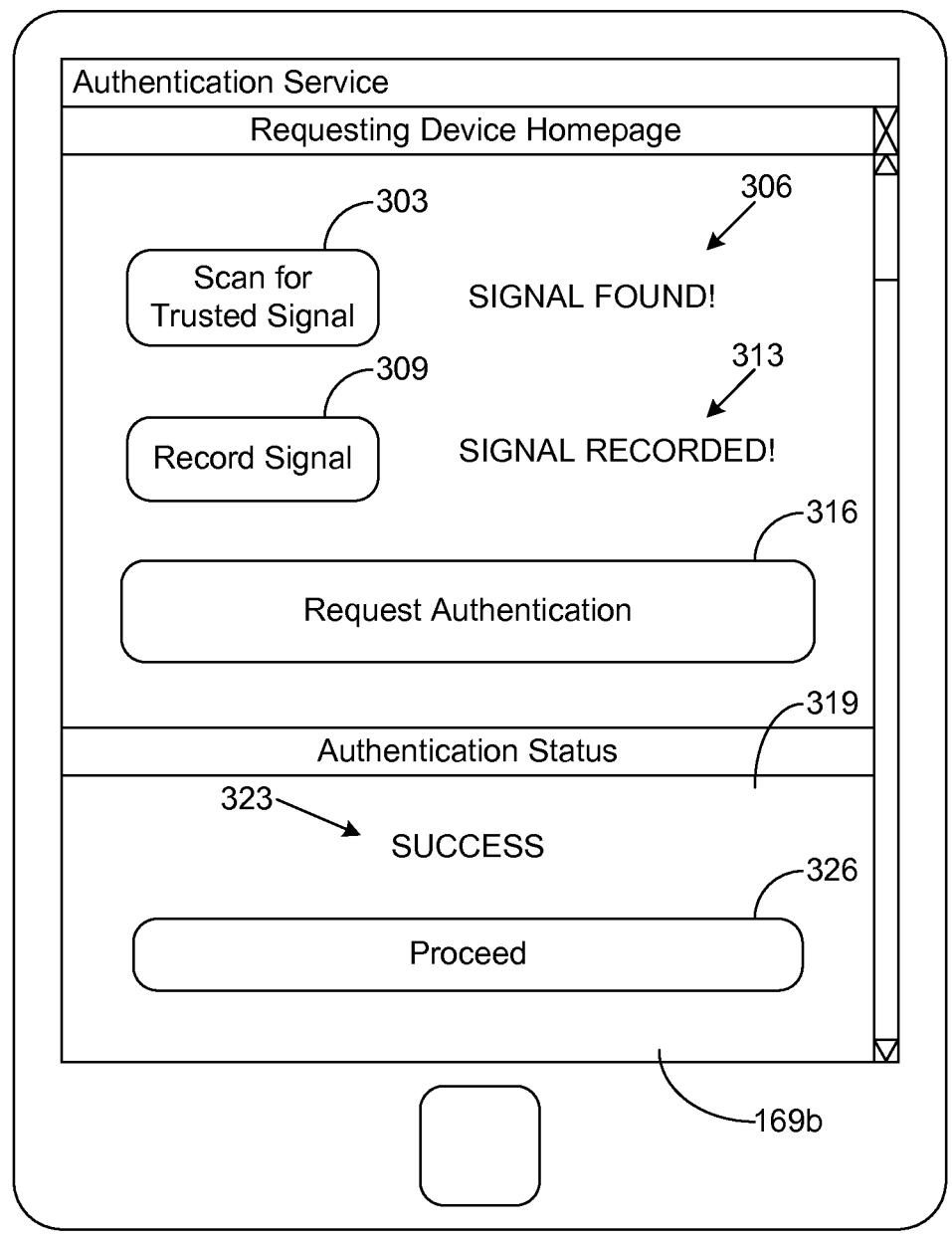

Turning now to FIG. 3, shown is one example of a network page 169, denoted herein as network page 169b, according to various embodiments of the present disclosure. The various graphical components such as blocks comprising information shown in FIG. 3 are merely examples of the various types of features that may be used to accomplish the specific function noted. The network page 169b is rendered on a display 173 (FIG. 1) associated with the client 106 (FIG. 1) according to various embodiments. In another embodiment, FIG. 3 may be viewed as depicting the display output of the client side application 166 (FIG. 1), according to various embodiments of the present disclosure.

In one embodiment, the authentication service 119 (FIG. 1) generates the network page 169b to display a homepage for a user on a requesting client 106b. As shown, the network page 169b depicts a scan button 303, a scan indicator 306, a record button 309, a recording indicator 313, a request button 316, and a status block 319. In addition, the status block 319 includes a status indicator 323 and a proceed button 326.

In one embodiment, toggling the scan button 303 may allow the user to scan for a rendered trusted signal 153 (FIG. 1) via an antenna, and/or other receiver associated with the requesting client 106b. The scan indicator 306 may then indicate whether a trusted signal 153 has been found. Next, toggling the record button 309 may record the found trusted signal 153 and the recording indicator 313 may then indicate whether the trusted signal 153 has been recorded. Toggling the request button 316 then transmits a request for authentication to the authentication service 119.

Next, the network page 169b depicts a result of the authentication by the authentication service 119 in the status block 319. In one embodiment, the status indicator 323 depicts whether the authentication was successful and a proceed button 326 may become available for toggling based on the result of the authentication. Toggling the proceed button 326 allows the user on the requesting client 106b to advance to accessing applications 123 (FIG. 1) and/or other protected content, as described above.

Figure 4:
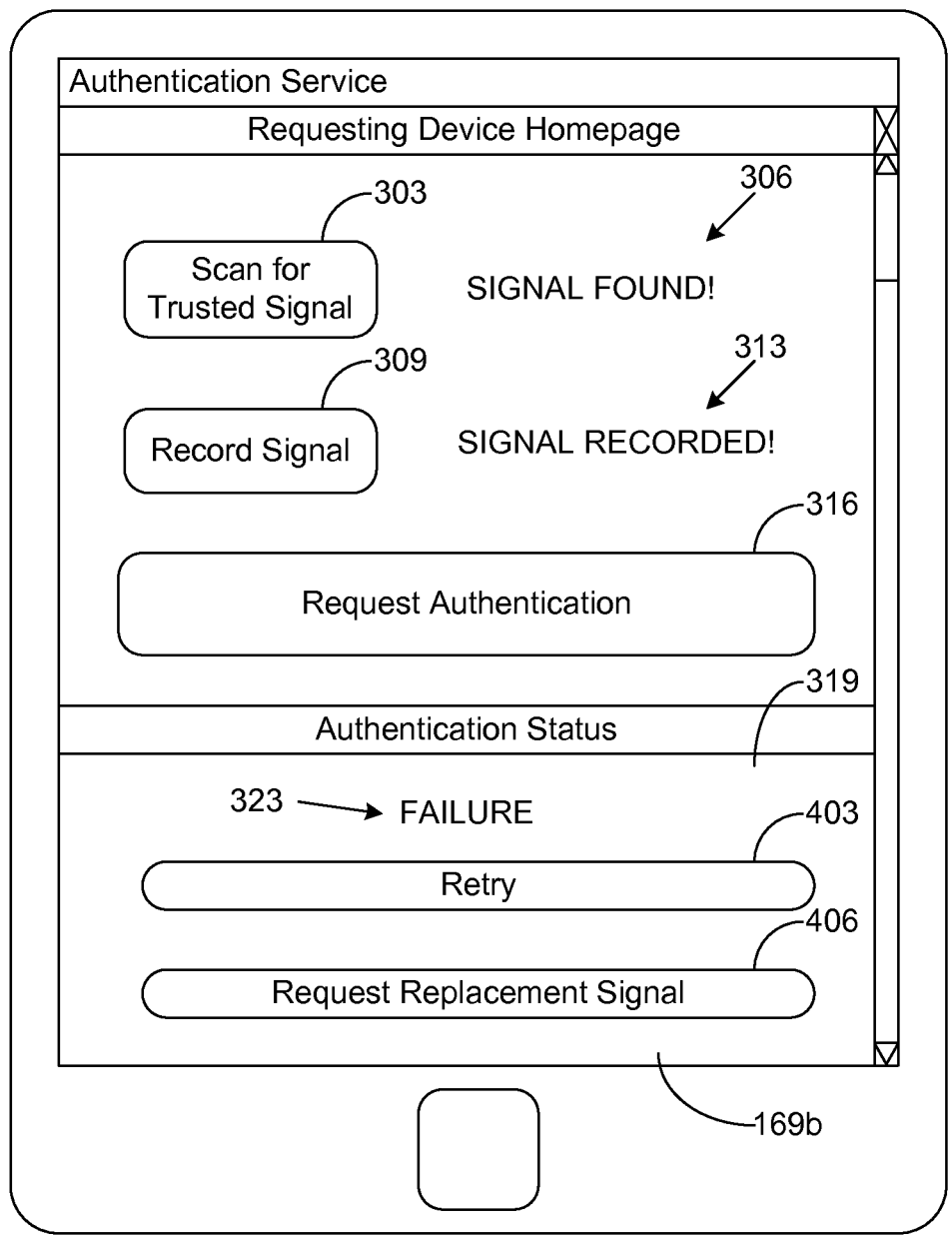

Moving on to FIG. 4, shown is one example of a network page 169, denoted herein as network page 169b, according to various embodiments of the present disclosure. The various graphical components such as blocks comprising information shown in FIG. 4 are merely examples of the various types of features that may be used to accomplish the specific function noted. The network page 169b is rendered on a display 173 (FIG. 1) associated with the client 106 (FIG. 1) according to various embodiments. In another embodiment, FIG. 4 may be viewed as depicting the display output of the client side application 166 (FIG. 1), according to various embodiments of the present disclosure.

In one embodiment, the authentication service 119 (FIG. 1) generates the network page 169b to display a homepage for a user on a requesting client 106b. As shown, the network page 169b depicts a scan button 303, a scan indicator 306, a record signal 309, a recording indicator 313, a request button 316, and a status block 319, as described above with respect to FIG. 3. In this embodiment, the status block 319 comprises a status indicator 323, a retry button 403, and a request replacement button 406. As described above, the authentication service 119 may not authenticate a requesting client 106b if the contested signal 149 (FIG. 1) does not correspond with the trusted signal 153 (FIG. 1). Accordingly, the authentication service 119 may notify the requesting client 106b of the failure to authenticate as show in the status indicator 323. A retry button 403 and a request replacement button 406 may then become available for toggling.

In one embodiment, toggling the retry button 403 may transmit another request to the authentication service 119 for authentication using the previously recorded signal. Alternatively, the user on the requesting client 106b may submit another request for authentication by toggling the scan button 303 and record button 309 again to generate another recording of the rendered trusted signal 153. In one embodiment, the trusted signal 153 may not be rendered continuously, as described above. Toggling the request replacement button 406 may transmit a request to the authentication service 119 to render the trusted signal 153.

Figure 5:
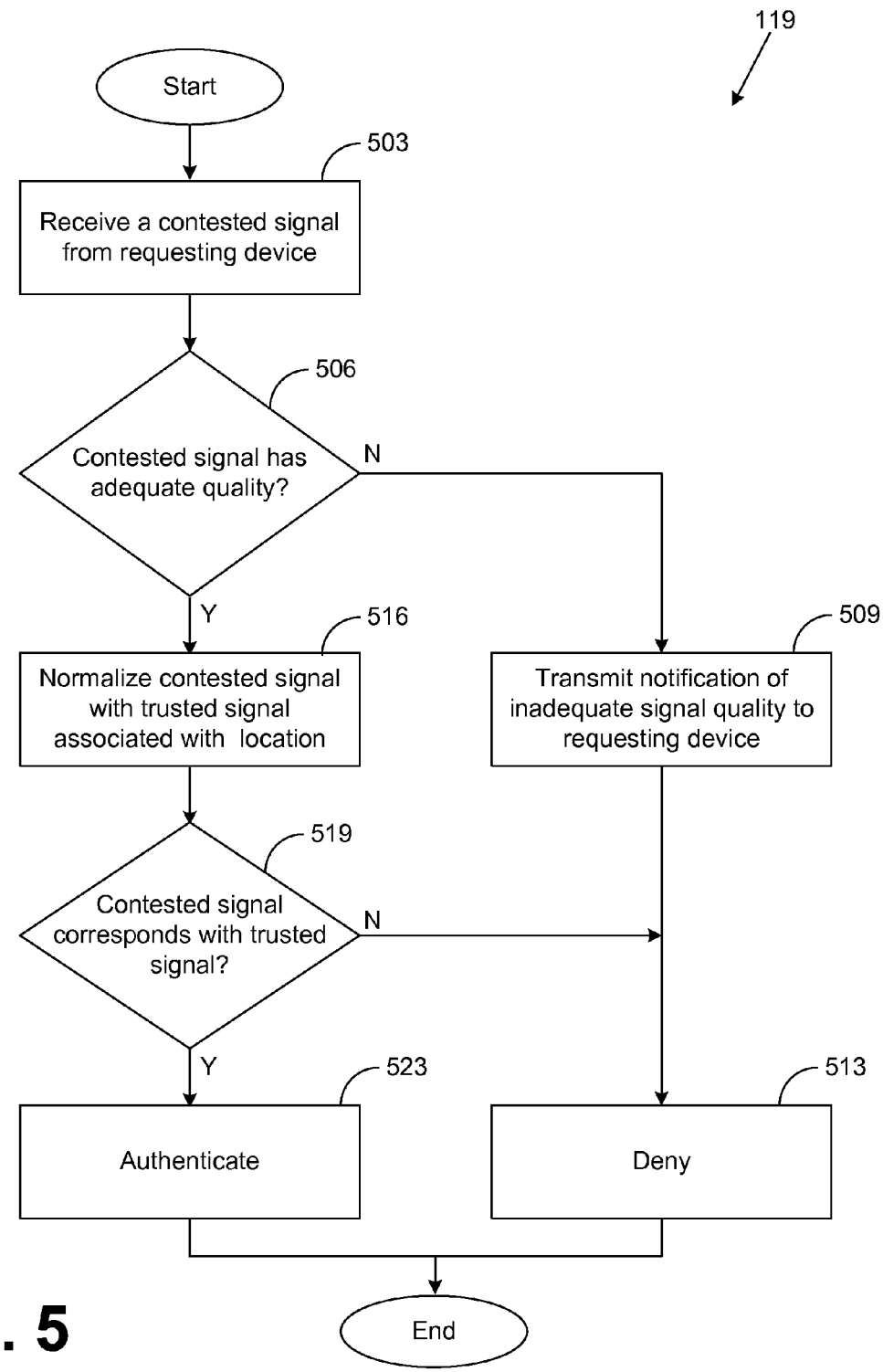
FIG. 5 is a flowchart illustrating one example of functionality implemented as portions of an authentication service executed in a computing device in the networked environment of FIG. 1 according to various embodiments of the present disclosure.

Referring next to FIG. 5, shown is a flowchart that provides one example of the operation of a portion of the authentication service 119 according to various embodiments. It is understood that the flowchart of FIG. 5 provides merely an example of the many different types of functional arrangements that may be employed to implement the operation of the portion of the authentication service 119 as described herein. As an alternative, the flowchart of FIG. 5 may be viewed as depicting an example of steps of a method implemented in the computing device 103 (FIG. 1) according to one or more embodiments.

According to one embodiment, the authentication service 119 authenticates a user on a requesting client 106b (FIG. 1) requesting access to one or more applications 123 (FIG. 1) and/or protected content based on a location of the requesting client 106b in relation to a trusted client 106a. In one embodiment, the authentication service 119 grants access to the applications 123 and/or protected content if the requesting client 106b is located within a predetermined distance of the trusted client 106a.

Beginning with box 503, the authentication service 119 receives a contested signal 149 (FIG. 1) from the requesting client 106b. In one embodiment, the contested signal 149 may be a recording of a trusted signal 153 (FIG. 1) rendered by the trusted client 106a and/or any other rendering source. As described above, the contested signal 149 may be a recording of a file 129 (FIG. 1) in a file system 126 (FIG. 1) and/or a recording of a speech, such as, for instance, a passphrase.

Next, in box 506, the authentication service 119 determines whether the contested signal 149 is of an adequate signal quality according to a predetermined quality threshold. In one embodiment, the authentication service 119 generates one or more quality metrics 156 (FIG. 1) indicative of a quality of the contested signal 149, such as, for instance, an intensity of the contested signal 149. The authentication service 119 then determines whether the quality metrics 156 are adequate to perform the authentication analysis, as described above. As such, if the quality metrics satisfy the predetermined quality threshold, the authentication service 119 then proceeds to box 516. However, if the quality metrics 156 fail to satisfy the predetermined quality threshold, the authentication service 119 proceeds to box 509 and transmits a notification to the requesting client 106b that the contested signal 149 lacks the adequate signal quality. Then, in box 513, the authentication service 119 denies the request for accessing the applications 123 and/or protected content on the requesting client 106b.

Returning to box 516, the authentication service 119 normalizes the contested signal 149 according to the trusted signal 153. In one embodiment, the authentication service 119 may utilize a variety of normalization approaches to normalize the contested signal 149, such as, for instance peak normalization and/or RMS normalization, as described above. In addition, the authentication service 119 may normalize the contested signal 149 according to the device characteristics of the requesting client 106b. For instance, a microphone associated with the requesting client 106b may introduce interference in the contested signal 149 during recording of the rendered signal, as described above.

Then, in box 519, the authentication service 119 determines whether the normalized contested signal 149 corresponds to the trusted signal 153. In one embodiment, the authentication service 119 compares the contested signal metrics 159 associated with the contested signal 149 against the trusted signal metrics 163 associated with the trusted signal 153, as described above. If the authentication service 119 determines that a predetermined number of contested signal metrics 159 correspond to respective ones of the trusted signal metrics 163 to a predetermined accuracy, the authentication service 119 may conclude that the contested signal 149 corresponds with the trusted signal 153. Then, in box 523, the authentication service 119 may authenticate the requesting client 106b and grant access to the applications 123 and/or protected content.

However, if the authentication service 119 does not determine that a predetermined number of contested signal metrics 159 correspond to respective ones of the trusted signal metrics 163 to a predetermined accuracy, the authentication service 119 may conclude that the contested signal 149 does not correspond to the trusted signal 153. Then, the authentication service 119 proceeds to box 513 to deny the authentication and deny the request to access the applications 123 and/or protected content.

Figure 6:
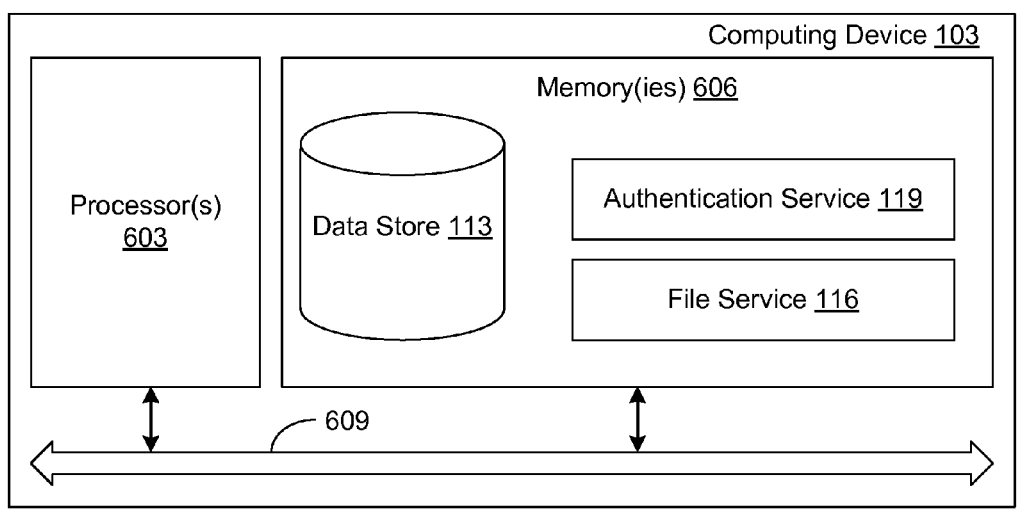
FIG. 6 is a schematic block diagram that provides one example illustration of a computing device employed in the networked environment of FIG. 1 according to various embodiments of the present disclosure.

With reference to FIG. 6, shown is a schematic block diagram of the computing device 103 according to an embodiment of the present disclosure. The computing device 103 includes at least one processor circuit, for example, having a processor 603 and a memory 606, both of which are coupled to a local interface 609. To this end, the computing device 103 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are a file service 116, an authentication service 119, and potentially other applications. Also stored in the memory 606 may be a data store 113 and other data. In addition, an operating system may be stored in the memory 606 and executable by the processor 603.

It is understood that there may be other applications that are stored in the memory 606 and are executable by the processors 603 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and the memory 606 may represent multiple memories 606 that operate in parallel processing circuits, respectively. In such a case, the local interface 609 may be an appropriate network 109 (FIG. 1) that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the file service 116 and the authentication service 119, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 5 shows the functionality and operation of an implementation of portions of the authentication service 119. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowchart of FIG. 5 a specific order of execution, it is understood that the order of execution may differ from that which is depicted. For example, the order of execution of two or more blocks may be scrambled relative to the order shown. Also, two or more blocks shown in succession in FIG. 5 may be executed concurrently or with partial concurrence. Further, in some embodiments, one or more of the blocks shown in FIG. 5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the file service 116, and the authentication service 119, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, wherein, when executed, the program causes the computing device to at least:
   establish a trusted signal as being rendered at a location by a speaker in communication with a trusted computing device, wherein the trusted signal is rendered at a level corresponding to a desired reception distance, wherein the trusted signal is at least one of an audio file, a recorded passphrase, or an ambient noise recording;
   determine a plurality of trusted signal metrics that describe the trusted signal;
   receive a contested signal from a contested computing device, the contested signal comprising a recording of the trusted signal being rendered at the location, wherein the contested computing device obtains the recording using a microphone in communication with the contested computing device;
   determine whether the contested signal satisfies a predetermined quality threshold; and
   wherein responsive to a determination that the contested signal satisfies the predetermined quality threshold, the program further causes the computing device to:
      normalize the contested signal according to the trusted signal and a plurality of device characteristics of the contested computing device to generate a normalized version of the contested signal;
      determine a plurality of contested signal metrics associated with the contested signal that describe the normalized version of the contested signal; and
      determine that the contested computing device and the trusted computing device are located in a shared acoustic environment when the contested signal corresponds to the trusted signal, wherein the contested signal corresponds to the trusted signal if at least a predetermined number of the contested signal metrics correspond to respective ones of the trusted signal metrics with at least a predetermined degree of accuracy.

2. The non-transitory computer-readable medium of claim 1, wherein the program further causes the computing device to at least authenticate a user to use a service in response to the contested signal corresponding to the trusted signal.

3. The non-transitory computer-readable medium of claim 1, wherein the plurality of contested signal metrics comprise at least an amplitude, a frequency, a tone, and a phase.

4. A system, comprising:
a data store configured to store authentication data; and
a computing device in communication with the data store, the computing device configured to at least:
receive a contested signal from a contested computing device, wherein the contested signal is a recording of a rendering of a trusted signal, wherein the rendering of the trusted signal is produced by a speaker of a trusted computing device in a trusted geographical location, wherein the recording is obtained using a microphone in communication with the contested computing device in a contested geographical location;
normalize the contested signal with the trusted signal to generate a normalized version of the contested signal; and
determine that the contested geographical location and the trusted geographical location are in a shared acoustic environment if the normalized version of the contested signal corresponds to the trusted signal, wherein the normalized version of the contested signal corresponds to the trusted signal if a predetermined number of a plurality of contested signal metrics associated with the normalized version of the contested signal correspond to respective ones of a plurality of trusted signal metrics associated with the trusted signal.

5. The system of claim 4, wherein, to generate the normalized version of the contested signal, the computing device is further configured to at least:
correct the contested signal according to a plurality of requesting device characteristics;
conduct a Fourier analysis to correct for a phase shift of the contested computing device; and
conduct a peak normalization of the contested signal.

6. The system of claim 4, wherein the plurality of contested signal metrics comprise at least an amplitude, a frequency, a tone, and a phase.

7. The system of claim 6, wherein the plurality of contested signal metrics are measured over time.

8. The system of claim 4, wherein the normalized version of the contested signal is aligned with the trusted signal based at least in part on a clock.

9. The system of claim 4, wherein the computing device is further configured to at least determine whether the contested signal satisfies a predetermined quality threshold.

10. The system of claim 9, wherein the computing device determines that the contested signal satisfies the predetermined quality threshold if a plurality of audio quality metrics exceed the predetermined quality threshold.

11. The system of claim 10, wherein the audio quality metrics comprise an amplitude of the contested signal, a dynamic range of the contested signal, and a signal to noise ratio of the contested signal.

12. The system of claim 9, wherein responsive to determining that the contested signal does not satisfy the predetermined quality threshold, the computing device is further configured to at least:
transmit an indication of a lack of audio quality to the contested computing device; and
receive a replacement contested signal from the contested computing device.

13. A computer-implemented method, comprising:
receiving a first signal from a first device and a second signal from a second device, wherein the second signal is a recording of a rendering of the first signal, wherein the rendering of the first signal is produced by a speaker associated with the first device in a first location, wherein the second signal is recorded by the second device in a second location;
normalizing the second signal to generate a normalized version of the second signal; and
determining that the second device and the first device are located in a shared acoustic environment if the normalized version of the second signal corresponds to the first signal.

14. The computer-implemented method of claim 13, wherein the first signal is at least one of at least a portion of an audio clip, a speech recording, or an ambient noise recording.

15. The computer-implemented method of claim 13, further comprising determining whether the second signal satisfies a predetermined quality threshold, wherein the predetermined quality threshold is determined based at least in part on a plurality of audio quality metrics.

16. The computer-implemented method of claim 15, wherein the audio quality metrics comprise an amplitude of the second signal, a dynamic range of the second signal, and a signal to noise ratio of the second signal.

17. The method of claim 15, wherein the normalized version of the second signal is generated if the second signal satisfies the predetermined quality threshold.

18. The computer-implemented method of claim 13, wherein normalizing the second signal comprises:
correcting the second signal according to a plurality of characteristics associated with the second device;
correcting a phase shift of the second signal; and
conducting a peak normalization of the first signal.

19. The computer-implemented method of claim 13, wherein the second device and the first device are determined to be located in the shared acoustic environment if a predetermined number of a plurality of contested signal metrics associated with the normalized version of the second signal correspond to respective ones of a plurality of trusted signal metrics associated with the first signal.

20. The computer-implemented method of claim 19, wherein the contested signal metrics comprise at least an amplitude, a frequency, a tone, and a phase.

21. The computer-implemented method of claim 20, wherein the contested signal metrics are measured over time.

22. A computer-implemented method, comprising:
receiving a first signal rendered by a speaker of a first device;
receiving a second signal recorded using a microphone of a second device, wherein the second signal is a recording of the first signal being rendered by the speaker;
determining whether the second signal satisfies a predetermined quality threshold;
normalizing the second signal to generate a normalized version of the second signal in response to determining that the second signal satisfies the predetermined quality threshold; and
determining that the second device and the first device are in a shared acoustic environment if the normalized version of the second signal corresponds to the first signal.

23. The method of claim 22, wherein determining whether the second signal satisfies the predetermined quality threshold is based at least in part on a plurality of audio quality metrics, wherein the audio quality metrics comprise at least an amplitude of the second signal, a dynamic range of the second signal, and a signal to noise ratio of the second signal.

24. The method of claim 22, wherein the normalized version of the second signal corresponds to the first signal if a predetermined number of signal metrics correspond between the normalized version of the second signal and the first signal.

\* \* \* \* \*